United States Patent
Suzuki et al.

(10) Patent No.: US 12,545,098 B2
(45) Date of Patent: Feb. 10, 2026

(54) VEHICLE DRIVE DEVICE

(71) Applicant: AISIN CORPORATION, Aichi (JP)

(72) Inventors: Tomoharu Suzuki, Kariya (JP); Mitsuhiko Kato, Kariya (JP); Hiroki Takayanagi, Echizen (JP)

(73) Assignee: AISIN CORPORATION, Kariya (JP)

( * ) Notice: Subject to any disclaimer, the term of this patent is extended or adjusted under 35 U.S.C. 154(b) by 322 days.

(21) Appl. No.: 18/038,370

(22) PCT Filed: Feb. 21, 2022

(86) PCT No.: PCT/JP2022/006861
§ 371 (c)(1),
(2) Date: May 23, 2023

(87) PCT Pub. No.: WO2022/177000
PCT Pub. Date: Aug. 25, 2022

(65) Prior Publication Data
US 2024/0001754 A1  Jan. 4, 2024

(30) Foreign Application Priority Data
Feb. 22, 2021 (JP) ................. 2021-026046

(51) Int. Cl.
*B60K 6/387* (2007.10)
*B60K 6/442* (2007.10)

(52) U.S. Cl.
CPC .............. *B60K 6/387* (2013.01); *B60K 6/442* (2013.01); *B60Y 2200/92* (2013.01)

(58) Field of Classification Search
CPC .................. B60K 6/387; B60K 6/442; B60K 2006/266; B60K 2006/4808; B60K 2006/4825; B60K 2006/4833; B60K 6/40; B60K 6/38; B60W 10/02; B60W 10/06; B60W 10/08; B60W 10/10; B60W 20/20; B60W 30/182; B60W 20/40; B60W 10/30; F16H 3/72; F16H 63/18
See application file for complete search history.

(56) References Cited

FOREIGN PATENT DOCUMENTS

DE  102011089710 A1 * 6/2013 ............... B60K 6/48
DE  102011089711 A1 * 6/2013 ............. B60K 6/445
(Continued)

OTHER PUBLICATIONS

May 13, 2024 Extended European Search Report issued in European Patent Application No. 22756317.8.
(Continued)

*Primary Examiner* — Tisha D Lewis
(74) *Attorney, Agent, or Firm* — Oliff PLC

(57) ABSTRACT

In a vehicle drive device, a first drive device configured to drive a first engagement device configured to connect or disconnect power transmission between an input member and a first rotor includes a first shift drum and a first cam mechanism. A second drive device configured to drive a second engagement device configured to connect or disconnect power transmission between the first rotor and an output member includes a second shift drum and a second cam mechanism. The first shift drum and the second shift drum are coaxially disposed and connected via a drum drive shaft so as to rotate integrally. The vehicle drive device includes a drum drive source configured to drive the drum drive shaft.

8 Claims, 6 Drawing Sheets

(56) References Cited

FOREIGN PATENT DOCUMENTS

| EP | 3106336 A1 | * | 12/2016 | ............... B60K 6/36 |
|----|------------|---|---------|---------------------------|
| JP | 2007-056994 A | | 3/2007 | |
| JP | 2016-088385 A | | 5/2016 | |
| JP | 2018-154208 A | | 10/2018 | |
| JP | 2019049320 A | * | 3/2019 | ............ F16H 63/18 |
| WO | WO-2018181557 A1 | * | 10/2018 | ............ F16H 63/18 |
| WO | 2020/212385 A1 | | 10/2020 | |

OTHER PUBLICATIONS

Apr. 5, 2022 International Search Report issued in International Patent Application No. PCT/JP2022/006861.

* cited by examiner

VEHICLE DRIVE DEVICE

TECHNICAL FIELD

This application is a national stage of International Application No. PCT/JP2022/006861, filed on Feb. 21, 2022, which claims the benefit of priority to Japanese Patent Application No. 2021-026046, filed on Feb. 22, 2021. The disclosures of the foregoing applications are incorporated herein by reference in their entireties. The present disclosure relates to a vehicle drive device including an input member drivingly connected to an internal combustion engine, an output member drivingly connected to wheels, a first rotary electric machine, a second rotary electric machine, and a plurality of gears drivingly connecting these components.

BACKGROUND ART

Japanese Unexamined Patent Application Publication No. 2016-88385 (JP 2016-88385 A) discloses a vehicle drive device for a hybrid vehicle, including a first rotary electric machine (MG1) in which a rotor is drivingly connected, via a first engagement device (CL2), to an input member drivingly connected to an internal combustion engine, and a second rotary electric machine (MG2) in which a rotor is drivingly connected, via a second engagement device (CL1), to an output member drivingly connected to wheels (in the background art, signs in parentheses are those in the reference document). This vehicle drive device is capable of so-called one-motor EV (electric vehicle) traveling in which the second rotary electric machine (MG2) is used as a driving force source for the wheels by disengaging the first engagement device (CL2) and the second engagement device (CL1). This vehicle drive device is also capable of so-called two-motor EV traveling in which the first rotary electric machine (MG1) and the second rotary electric machine (MG2) are used as driving force sources for the wheels by disengaging the first engagement device (CL2) and engaging the second engagement device (CL1).

This vehicle drive device is also capable of so-called series-hybrid traveling in which the first rotary electric machine (MG1) generates electric power and the second rotary electric machine (MG2) is used as a driving force source for the wheels by engaging the first engagement device (CL2) and disengaging the second engagement device (CL1). This vehicle drive device is also capable of so-called parallel-hybrid traveling in which the internal combustion engine, the first rotary electric machine (MG1), and the second rotary electric machine (MG2) are used as driving force sources for the wheels by engaging the first engagement device (CL2) and the second engagement device (CL1). At this time, the first rotary electric machine (MG1) can function as either a power generator or an electric motor. In this manner, this vehicle drive device is configured to switch a plurality of traveling modes depending on the engagement states of the first engagement device (CL2) and the second engagement device (CL1).

RELATED ART DOCUMENTS

Patent Documents

Patent Document 1: Japanese Unexamined Patent Application Publication No. 2016-88385 (JP 2016-88385 A)

SUMMARY OF THE DISCLOSURE

Problem to be Solved by the Disclosure

In order to switch these traveling modes, it is necessary to switch the engagement states of the two engagement devices as described above. In general, a hydraulic pressure is often used to drive such engagement devices. When a hydraulic circuit for driving the two engagement devices is provided, the structure of the vehicle drive device may be complicated. It is conceivable to drive the engagement devices by using electric actuators or the like. When the plurality of actuators is disposed in this manner, the size and cost of the vehicle drive device increase. As described above, the size and cost of the vehicle drive device may increase depending on the configuration for driving the engagement devices.

In view of the above background, there is a demand to provide a technology for facilitating reduction in the size and cost of a vehicle drive device for a hybrid vehicle.

Means for Solving the Problem

In view of the above problems, a vehicle drive device includes an input member drivingly connected to an internal combustion engine, an output member drivingly connected to a wheel, a first rotary electric machine including a first rotor, a second rotary electric machine including a second rotor, a first engagement device configured to connect or disconnect power transmission between the input member and the first rotor, a second engagement device configured to connect or disconnect power transmission between the first rotor and the output member, a first drive device configured to drive the first engagement device, and a second drive device configured to drive the second engagement device. The first drive device includes a rotatably supported first shift drum, and a first cam mechanism configured to convert a rotational motion of the first shift drum into a linear motion and transmit the linear motion to the first engagement device. The second drive device includes a rotatably supported second shift drum, and a second cam mechanism configured to convert a rotational motion of the second shift drum into a linear motion and transmit the linear motion to the second engagement device. The first shift drum and the second shift drum are coaxially disposed and connected via a drum drive shaft so as to rotate integrally. A drum drive source is provided to drive the drum drive shaft.

According to this configuration, it is possible to realize a hybrid vehicle drive device capable of executing both a series-hybrid mode and a parallel-hybrid mode. Both the first drive device that drives the first engagement device and the second drive device that drives the second engagement device can be driven by the one drum drive source. Therefore, the cost of the vehicle drive device can be reduced and the size of the vehicle drive device can easily be reduced compared to a configuration in which independent drive sources are provided for these two drive devices. That is, according to this configuration, it is possible to facilitate the reduction in the size and cost of the vehicle drive device for a hybrid vehicle.

Further features and advantages of the vehicle drive device will be clarified from the following description of exemplary and non-limiting embodiments with reference to the drawings.

MODES FOR CARRYING OUT THE DISCLOSURE

Hereinafter, embodiments of a vehicle drive device will be described with reference to the drawings. The direction of each member in the following description represents a direction of the member mounted on the vehicle drive device. Terms related to the dimension, the disposition direction, the disposition position, and the like of each member represent concepts that include a state in which there is a difference due to a variation (variation to an extent permissible in manufacturing).

The term "drivingly connected" herein refers to a state in which two or more rotation elements are connected so that a driving force (synonymous with torque) can be transmitted, and includes a state in which the two rotation elements are connected so as to rotate integrally or a state in which the two rotation elements are connected so as to be able to transmit a driving force via one, two, or more transmission members. Such transmission members include various members that transmit rotation at the same speed or at a changed speed (for example, a shaft, a gear mechanism, a belt, or a chain), and may include an engagement device that selectively transmits rotation and driving force (for example, a friction engagement device or an intermesh engagement device).

The "rotary electric machine" is herein used as a concept including any of a motor (electric motor), a generator (power generator), and a motor generator that functions as both a motor and a generator if necessary. Regarding the disposition of two members, the phrase "overlap when viewed in a specific direction" herein means that, when a virtual straight line parallel to the line-of-sight direction is moved in directions orthogonal to the virtual straight line, an area where the virtual straight line intersects both the two members is present at least in part. Regarding the disposition of the two members, the phrase "axial disposition areas overlap each other" herein means that an axial disposition area of one member includes at least a part of an axial disposition area of the other member.

Figure 1:
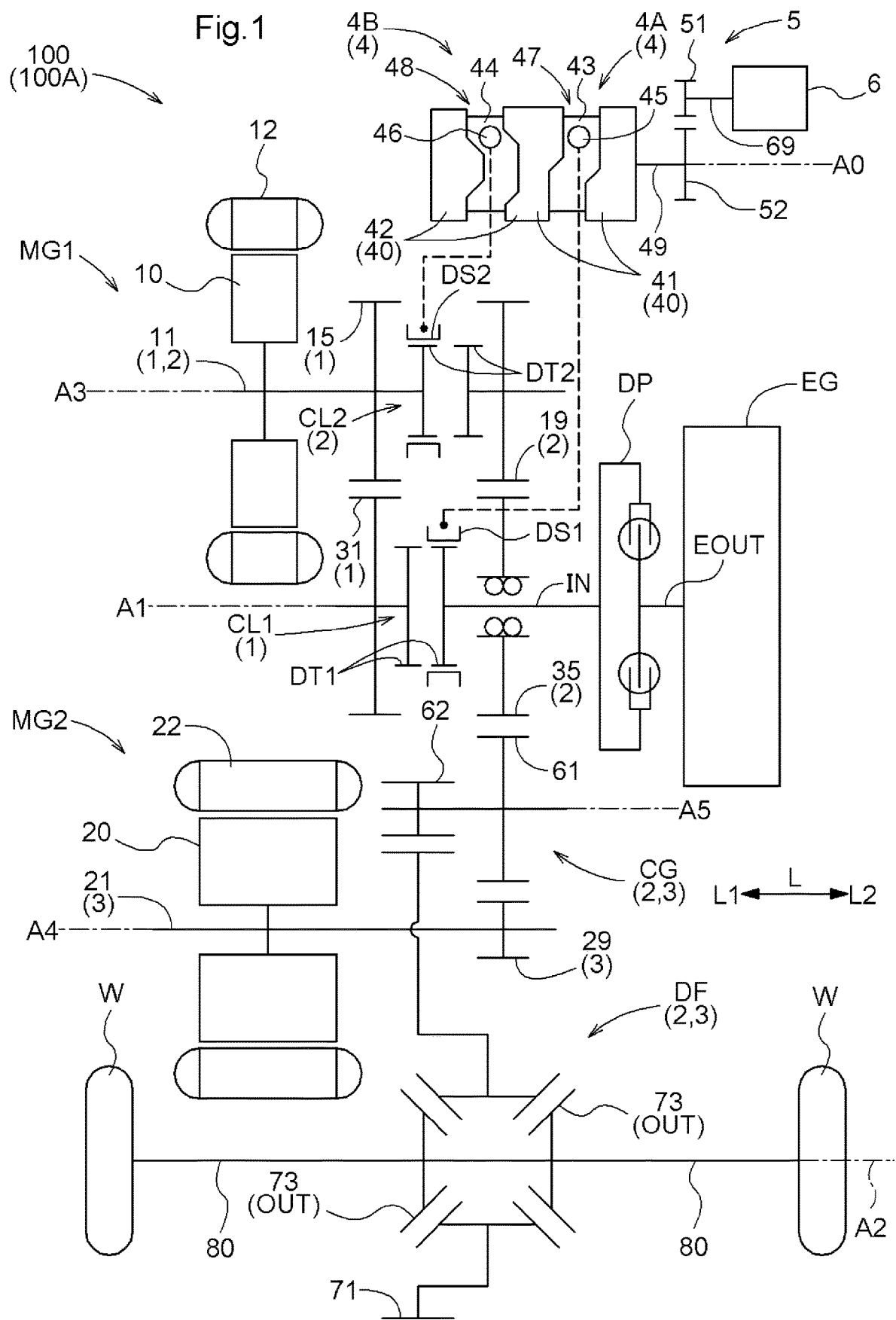
FIG. 1 is a skeleton diagram of a vehicle drive device.

As shown in FIG. 1, a vehicle drive device 100 includes an input member IN drivingly connected to an internal combustion engine EG, output members OUT drivingly connected to wheels W, a first rotary electric machine MG1 including a first rotor a second rotary electric machine MG2 including a second rotor 20, and a plurality of gear mechanisms. In the present embodiment, a pair of output members OUT is provided in association with a pair of wheels W. These components are housed in a case (not shown in FIG. 1). A part of the input member IN and a part of the pair of output members OUT are exposed outside the case.

The vehicle drive device 100 includes three driving force transmission systems between the input member IN and the output members OUT. A first transmission system 1 is a transmission system that drivingly connects the input member IN and the first rotor 10. A second transmission system 2 is a transmission system that drivingly connects the first rotor 10 and the output members OUT. A third transmission system 3 is a transmission system that drivingly connects the second rotor 20 and the output members OUT. A part or all of power transmission paths of the first transmission system 1, the second transmission system 2, and the third transmission system 3 may overlap power transmission paths of other transmission systems. The first transmission system 1 includes a first engagement device CL1 that connects or disconnects power transmission in the first transmission system 1. The second transmission system 2 includes a second engagement device CL2 that connects or disconnects power transmission in the second transmission system 2.

The vehicle drive device 100 includes a first drive device 4A that drives the first engagement device CL1, and a second drive device 4B that drives the second engagement device CL2. The first drive device 4A includes a rotatably supported first shift drum 41, and a first cam mechanism 47 that converts a rotational motion of the first shift drum 41 into a linear motion and transmits the linear motion to the first engagement device CL1. Similarly, the second drive device 4B includes a rotatably supported second shift drum 42, and a second cam mechanism that converts a rotational motion of the second shift drum 42 into a linear motion and transmits the linear motion to the second engagement device CL2. Although details will be described later, the first shift drum 41 and the second shift drum 42 are coaxially disposed and connected via a drum drive shaft 49 so as to rotate integrally. The vehicle drive device 100 includes a drum drive source 6 that drives the drum drive shaft 49.

The present embodiment exemplifies a form in which the first drive device 4A and the second drive device 4B are structured as one common clutch drive device 4. In the present embodiment, the first shift drum 41 and the second shift drum 42 partially share the members constituting them. The first shift drum 41 and the second shift drum 42 integrally rotate via the one common drum drive shaft 49. Details of the clutch drive device 4 will be described later.

Figure 5:
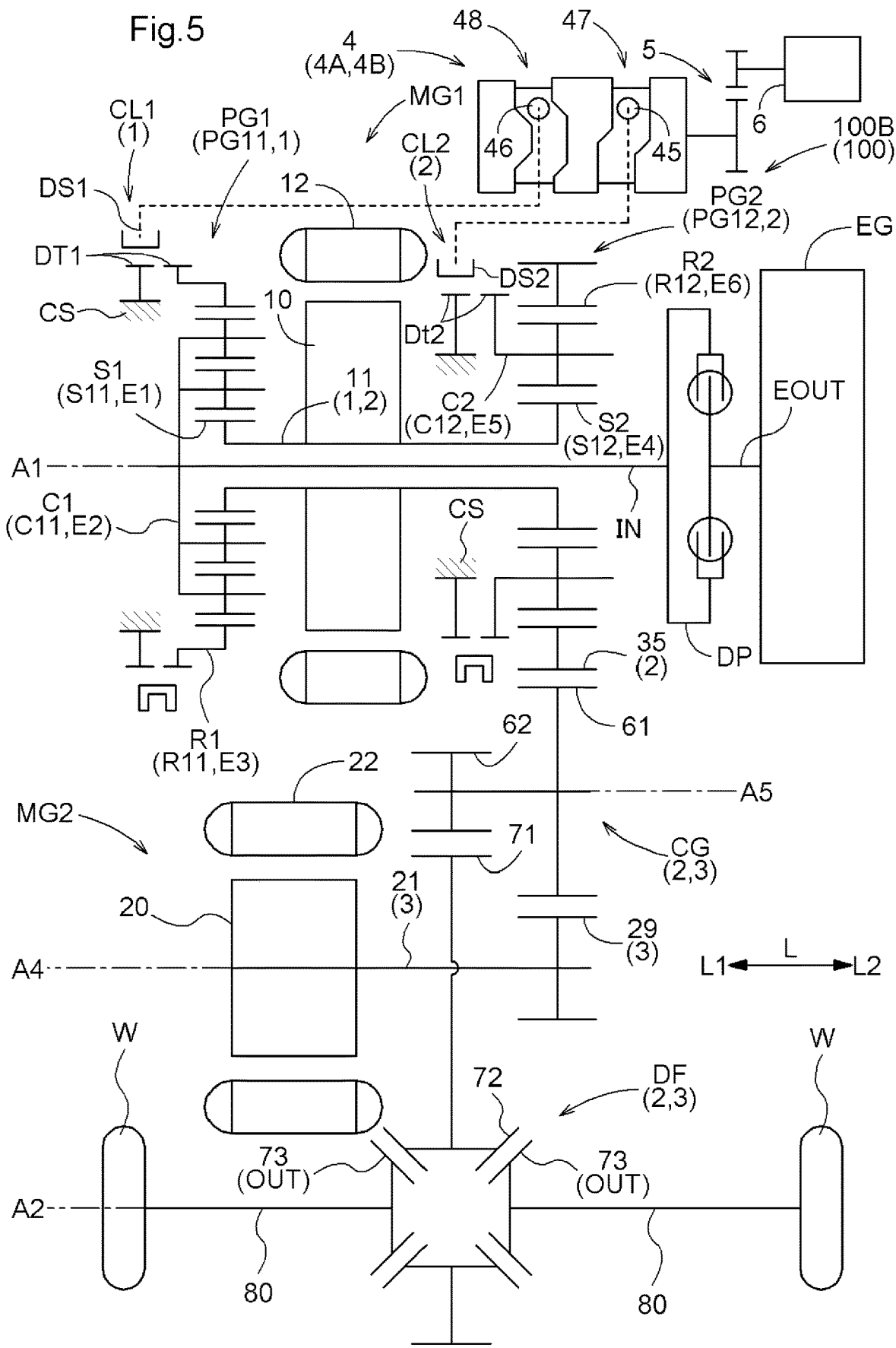
FIG. 5 is a skeleton diagram of another configuration example of the vehicle drive device (second vehicle drive device).
Figure 6:
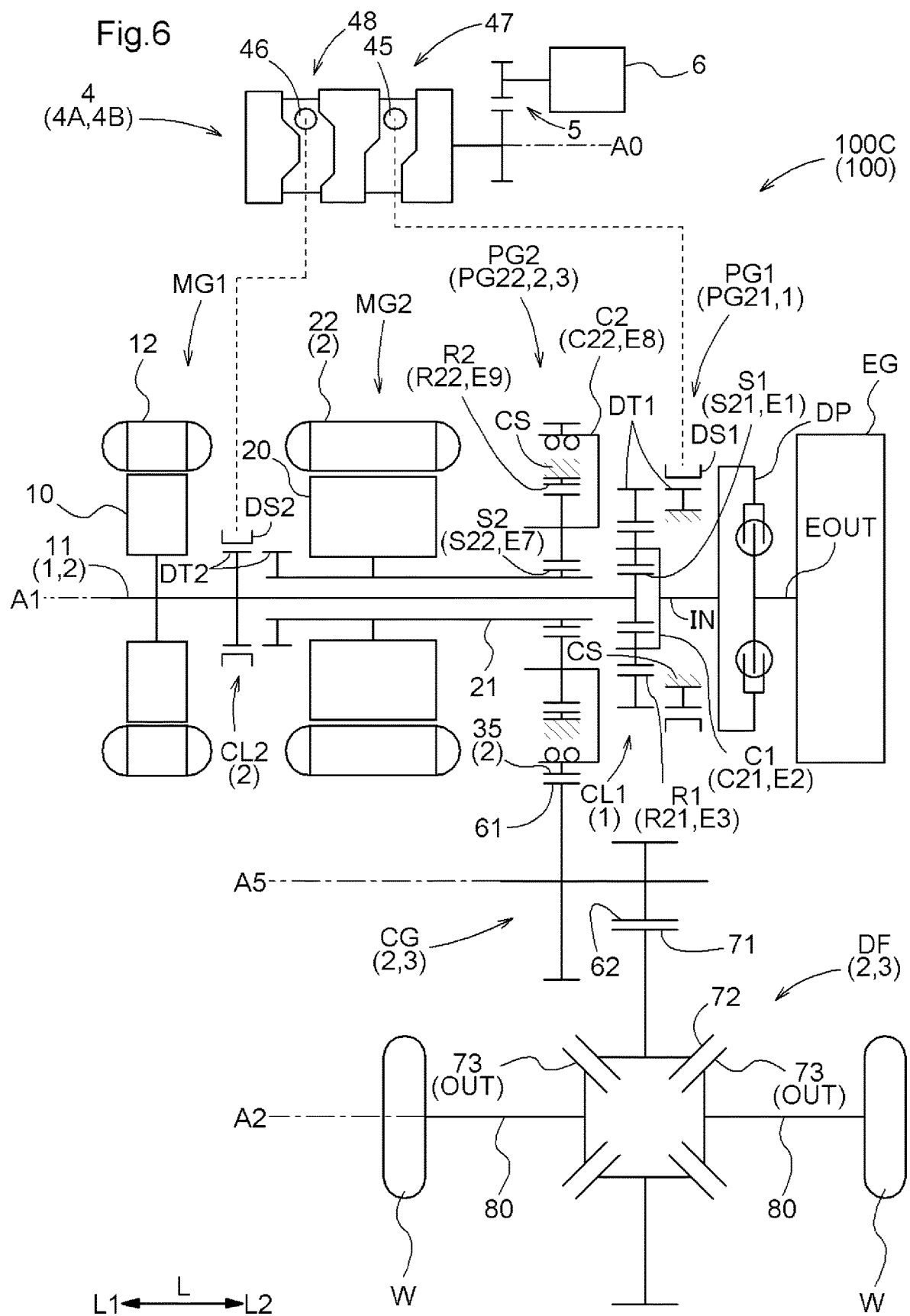
FIG. 6 is a skeleton diagram of another configuration example of the vehicle drive device (third vehicle drive device).
Figure 7:
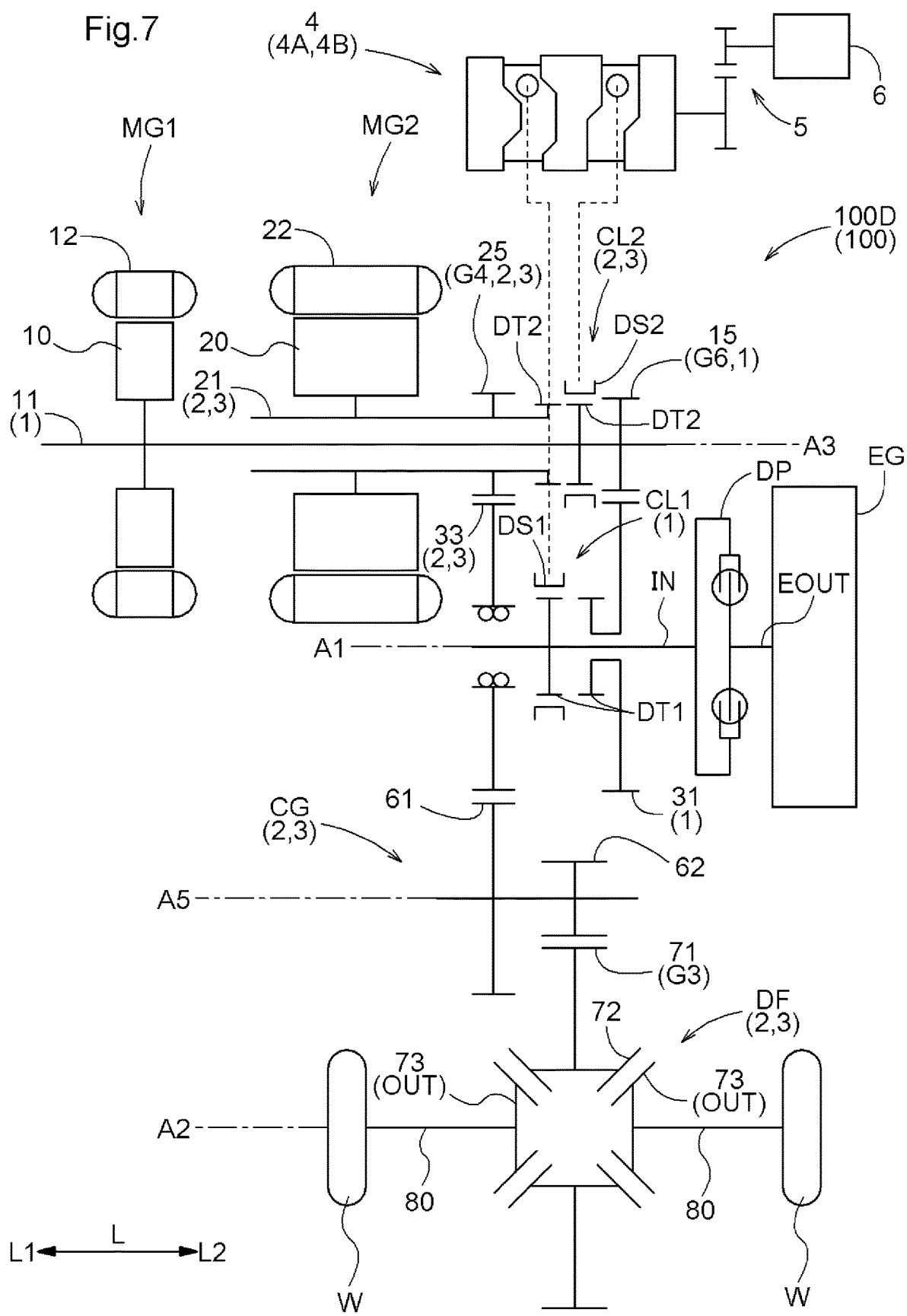
FIG. 7 is a skeleton diagram of another configuration example of the vehicle drive device (fourth vehicle drive device).

The configuration of the vehicle drive device 100 will be described below. Four embodiments will be described as examples herein. FIG. 1 shows the vehicle drive device 100 according to a first embodiment. FIG. 5 shows a vehicle drive device 100 according to a second embodiment. FIG. 6 shows a vehicle drive device 100 according to a third embodiment. FIG. 7 shows a vehicle drive device 100 according to a fourth embodiment. In any embodiment, the first engagement device CL1 and the second engagement device CL2 are driven by the clutch drive device 4 described above. When distinguishing the first to fourth embodiments, the vehicle drive device 100 according to the first embodiment will be referred to as "first vehicle drive device 100A", the vehicle drive device 100 according to the second embodiment will be referred to as "second vehicle drive device 100B", the vehicle drive device 100 according to the third embodiment will be referred to as "third vehicle drive device 100C", and the vehicle drive device 100 according to the fourth embodiment will be referred to as "fourth vehicle drive device 100D". When these are not distinguished, they will be simply referred to as "vehicle drive devices 100". Description of matters common to the embodiments will be omitted as appropriate.

As shown in FIG. 1, the input member IN and the first engagement device CL1 are disposed on a first axis A1. The output members OUT together with an output differential gear mechanism DF described later are disposed on a second axis A2 different from and parallel to the first axis A1. The first rotary electric machine MG1 and the second engagement device CL2 are disposed on a third axis A3 different from and parallel to the first axis A1 and the second axis A2. The second rotary electric machine MG2 is disposed on a fourth axis A4 different from and parallel to the first axis A1, the second axis A2, and the third axis A3. A direction along (parallel to) the first axis A1 (second axis A2, third axis A3, and fourth axis A4) is herein defined as an "axial direction L" of the vehicle drive device 100. One side in the axial direction L is herein defined as a "first axial side L1" and the other side in the axial direction L is herein defined as a "second axial side L2". The "second axial side L2" is a side where the input member IN is connected to the internal combustion engine EG. A direction orthogonal to each of the first axis A1 and the second axis A2 will be referred to as "radial direction" with respect to each axis. When it is not necessary to distinguish the axis to be used as a reference, or when the axis to be used as a reference is clear, the direction may be simply referred to as "radial direction". The above definitions of the "axial direction L" and the "radial direction" are the same when there is another axis parallel to the first axis A1 (second axis A2, third axis A3, and fourth axis A4).

Although details will be described later, the vehicle drive device 100 includes at least a counter gear mechanism CG and the output differential gear mechanism DF as the plurality of gear mechanisms. In the first vehicle drive device 100A shown in FIG. 1, the counter gear mechanism CG is disposed on a fifth axis A5 different from and parallel to the first axis A1, the second axis A2, the third axis A3, and the fourth axis A4, and the output differential gear mechanism DF is disposed on the second axis A2. The first vehicle drive device 100A also includes an input gear 31, a first rotor gear 15, a second rotor gear 25, a first rotary electric machine output gear 19, a second rotary electric machine output gear 29, and a counter drive gear 35. Details of the mechanisms and gears will be described later. The vehicle drive device 100 may be structured such that the input member IN and the first rotor 10 are drivingly connected, the first rotor 10 and the output members OUT are startingly connected, and the second rotor 20 and the output members OUT are drivingly connected by combinations of the plurality of gears and the like without including the counter gear mechanism CG and the output differential gear mechanism DF.

As described above, the first rotary electric machine MG1 and the second rotary electric machine MG2 have a function as a motor (electric motor) that receives supply of electric power to generate driving power, and a function as a generator (power generator) that receives supply of driving power to generate electric power. Therefore, the first rotary electric machine MG1 and the Dow-2 rotary electric machine MG2 are electrically connected to a power storage device (not shown). As this power storage device, various known power storage devices such as a battery and a capacitor can be used.

The first rotary electric machine MG1 functions as a generator that generates electric power by using a torque of the internal combustion engine EG, charges the power storage device, or supplies electric power for driving the second rotary electric machine MG2. The first rotary electric machine MG1 may function as a motor that generates a driving force (synonymous with "torque") by power running, for example, when the vehicle is traveling at high speed or when the internal combustion engine EG is started. The internal combustion engine EG is a prime mover (gasoline engine, diesel engine, or the like) that is driven by combustion of fuel to take out driving power. The second rotary electric machine MG2 mainly functions as a motor that generates a driving force for causing the vehicle to travel. The second rotary electric machine MG2 may function as a generator that regenerates an inertial force of the vehicle as electrical energy, for example, during deceleration of the vehicle.

The first rotary electric machine MG1 and the second rotary electric machine MG2 are inner rotor type rotary electric machines. The first rotary electric machine MG1 includes a first stator 12 and the first rotor 10. The first stator 12 is fixed to a non-rotating member (herein, the case), and the first rotor 10 is rotatably disposed on the radially inner side of the first stator 12. A first rotor shaft 11 that rotates integrally with the first rotor 10 is disposed on the radially inner side of the first rotor 10. Similarly, the second rotary electric machine MG2 includes a second stator 22 and the second rotor 20. The second stator 22 is fixed to a non-rotating member (herein, the case), and the second rotor 20 is rotatably disposed on the radially inner side of the second stator 22. A second rotor shaft 21 that rotates integrally with the second rotor 20 is disposed on the radially inner side of the second rotor 20.

As described above, in the first transmission system, the input member IN and the first rotor 10 are drivingly connected. In other words, the first rotor shaft 11 that rotates integrally with the first rotor 10 is drivingly connected to the input member. The input member IN is formed so as to extend along the axial direction L on the first axis A1. The input member IN is disposed on the first axial side L1 of the internal combustion engine EG. The input member IN is drivingly connected to an output shaft EOUT (such as a crankshaft) of the internal combustion engine EG via a damper device DP. The damper device DP is a device that damps fluctuations in a transmitted torque. For example, the damper device DP preferably includes a torque limiter for limiting an excessive load acting on the power transmission path from the output members OUT to the internal combustion engine EG when an excessive torque is input from the output side.

The input gear 31 is disposed on the first axis A1 to drivingly connect the input member IN disposed on the first axis A1 and the first rotor 10 disposed on the third axis A3. The first rotor gear 15 that rotates integrally with the first rotor 10 is disposed on the third axis A3. Specifically, the first rotor gear 15 is connected to the first rotor shaft 11 that rotates integrally with the first rotor 10. The input gear 31 disposed on the first axis A1 is selectively connected to the input member IN via the first engagement device CL1. The input gear 31 and the first rotor gear 15 mesh with each other. When the input member IN and the input gear 31 are connected via the first engagement device CL1, the driving power from the input member IN is transmitted to the first rotor 10. Accordingly, the input gear 31, the first engagement device CL1, the first rotor gear 15, and the first rotor shaft 11 are included in the first transmission system 1 that drivingly connects the input member IN and the first rotor 10.

When the first engagement device CL1 is disengaged, the input gear 31 is not connected to the input member IN and the driving power from the internal combustion engine EG is not transmitted to the input gear 31. Therefore, no driving force is transmitted between the internal combustion engine EG and the first rotor 10.

In the present embodiment, the first engagement device CL1 is an intermesh engagement device (dog clutch). The first engagement device CL1 is switchable between an engaged state and a disengaged state by the first drive device 4A. Specifically, the first engagement device CL1 includes a first meshing member DS1 (dog sleeve) configured to move along the axial direction L by the first drive device 4A, and a pair of first meshed members DT1 to be engaged with the first meshing member DS1. The first engagement device CL1 is switched between the engaged state and the disengaged state depending on the position of the first meshing member DS1 in the axial direction L. One of the pair of first meshed members DT1 is connected to the input member IN so as to rotate integrally with the input member IN, and the other is connected to the input gear 31 so as to rotate integrally with the input gear 31. The first engagement device CL1 is engaged when the first meshing member DS1 is engaged with both of the pair of first meshed members DT1, and is disengaged when the first meshing member DS1 is separated from at least one of the pair of first meshing members DS1.

The driving power is transmitted to the output members OUT via the output differential gear mechanism DF. The output differential gear mechanism DF distributes rotation of a differential input gear 71 to the pair of output members OUT. The output differential gear mechanism DF includes a pair of differential pinion gears 72 and a pair of side gears 73 supported by a differential case in addition to the differential input gear 71. Both the pair of differential pinion gears 72 and the pair of side gears 73 are bevel gears. The differential case is a hollow member that rotates integrally with the differential input gear 71, and houses the pair of differential pinion gears 72 and the pair of side gears 73 inside. In the present embodiment, each of the pair of side gears 73 is a part of the output differential gear mechanism DF and corresponds to the output member OUT.

The pair of differential pinion gears 72 is disposed so as to face each other with a distance along the radial direction with respect to the second axis A2. Each of the pair of differential pinion gears 72 is attached to a pinion shaft supported so as to rotate integrally with the differential case. Each of the pair of differential pinion gears 72 is rotatable (spinnable) about the pinion shaft and rotatable (revolvable) about the second axis A2.

The pair of side gears 73 is rotation elements after the distribution of the driving force in the output differential gear mechanism DF. The pair of side gears 73 is disposed so as to face each other across a pair of pinion shafts with a distance in the axial direction L. Each side gear 73 meshes with both the differential pinion gears 72. The pair of side gears 73 is connected to a pair of output shafts 80 so as to rotate integrally with the pair of output shafts 80.

The pair of output shafts 80 is formed so as to protrude to both sides in the axial direction L from the output differential gear mechanism DF. Specifically, the output shaft 80 on the first axial side L1 is disposed so that the end on the first axial side L1 passes through a case CS in the axial direction L and is exposed to the outside of the case, and the output shaft 80 on the second axial side L2 is disposed so that the end on the second axial side L2 passes through the case in the axial direction L and is exposed to the outside of the case CS. That is, the output shaft 80 on the first axial side L1 is integrally connected to the side gear 73 on the first axial side L1 so as to protrude to the first axial side L1 from the side gear 73. The output shaft 80 on the second axial side L2 is integrally connected to the side gear 73 on the second axial side L2 so as to protrude to the second axial side L2 from the side gear 73. The pair of output shafts 80 is drivingly connected to the wheels W. Each of the pair of output shafts 80 may be regarded as the output member OUT.

As described above, the second rotary electric machine MG2 is disposed on the fourth axis A4. The second rotary electric machine output gear 29 is disposed on the fourth axis A4 to drivingly connect the output members OUT disposed on the second axis A2 and the second rotor 20 disposed on the fourth axis A4. The second rotary electric machine output gear 29 is connected to the second rotor shaft 21 that rotates integrally with the second rotor 20. The second rotary electric machine output gear 29 is drivingly connected to the output differential gear mechanism DF via the counter gear mechanism CG disposed on the fifth axis A5. Accordingly, the second rotor shaft 21, the second rotary electric machine output gear 29, the counter gear mechanism CG, and the output differential gear mechanism DF are included in the second transmission system 2 that drivingly connects the second rotor 20 and the output members OUT.

The counter gear mechanism CG includes a first counter gear 61 and a second counter gear 62 that rotates integrally with the first counter gear 61. The first counter gear 61 is disposed on the second axial side L2 of the second counter gear 62. The second counter gear 62 is a gear having a smaller diameter than the first counter gear 61. The speed of rotation transmitted from the second rotary electric machine MG2 side is reduced and the rotation is transmitted to the output differential gear mechanism DF by the counter gear mechanism CG.

The first counter gear 61 is drivingly connected to the first rotary electric machine output gear 19 disposed on the third axis A3 via the counter drive gear 35 disposed on the first axis A1. The first rotary electric machine output gear 19 is drivingly connected to the first rotor shaft 11 via the second engagement device CL2. Although details will be described later, the counter gear mechanism CG drivingly connects the output members OUT and the second rotor 20. Therefore, the first rotor 10 to which the first rotor shaft 11 is connected and the output members OUT are drivingly connected via the second engagement device CL2.

The second engagement device CL2 in the engaged state connects the first rotor shaft 11 and the counter gear mechanism CG. By connecting the first rotor shaft 11 and the counter gear mechanism CG, the driving power from the internal combustion engine EG side and the first rotary electric machine MG1 side and the driving power from the second rotary electric machine MG2 side can be combined and transmitted to the output differential gear mechanism DF. The driving power from the first rotor 10 is transmitted to the output members OUT via the first rotary electric machine output gear 19, the counter drive gear 35, the counter gear mechanism CG, and the output differential gear mechanism DF. Accordingly, the first rotor shaft 11, the second engagement device CL2, the first rotary electric machine output gear 19, the counter drive gear 35, the counter gear mechanism CG, and the output differential gear mechanism DF are included in the second transmission system 2 that drivingly connects the first rotor 10 and the output members OUT.

The second engagement device CL2 is also an intermesh engagement device (dog clutch). The second engagement device CL2 is switchable between an engaged state and a disengaged state by the second drive device 4B. Specifically, the second engagement device CL2 includes a second meshing member DS2 (dog sleeve) configured to move along the axial direction L by the second drive device 4B, and a pair of second meshed members DT2 to be engaged with the second meshing member DS2. The second engagement device CL2 is switched between the engaged state and the disengaged state depending on the position of the second meshing member DS2 in the axial direction L. One of the pair of second meshed members DT2 is connected to the first rotor shaft 11 so as to rotate integrally with the first rotor shaft 11, and the other is connected to the first rotary electric machine output gear 19 so as to rotate integrally with the first rotary electric machine output gear 19. The second engagement device CL2 is engaged when the second meshing member DS2 is engaged with both of the pair of second meshed members DT2, and is disengaged when the second meshing member DS2 is separated from at least one of the pair of second meshed members DT2.

The vehicle drive device 100 can be driven in a plurality of operation modes as exemplified in, for example, Table 1 below depending on the operation states of the internal combustion engine EG, the first rotary electric machine MG1, the second rotary electric machine MG2, the first engagement device CL1, and the second engagement device CL2. In the fields for the first engagement device CL1 and the second engagement device CL2 in Table 1, "○" indicates that the target engagement device is engaged. In the fields for the internal combustion engine EG, the first rotary electric machine MG1, and the second rotary electric machine MG2, "○" indicates that the target power source is outputting driving power. In the fields for the first rotary electric machine MG1, "●" indicates that electric power is being generated by transmitted driving power. In the fields for the first engagement device CL1 and the second engagement device CL2, "x" indicates that the target engagement device is disengaged. In the fields for the internal combustion engine EG, the first rotary electric machine MG1, and the second rotary electric machine MG2, "x" indicates that the target power source is not outputting driving power and the rotary electric machine is not generating electric power.

TABLE 1

| Operation mode | CL1 | CL2 | EG | MG1 | MG2 |
|---|---|---|---|---|---|
| FIRST EV MODE | X/○ | X | X | X | ○ |
| SECOND EV MODE | X | ○ | X | ○ | ○ |
| FIRST HV MODE | ○ | X | ○ | ● | ○ |
| SECOND HV MODE | ○ | ○ | ○ | X/○/● | X/○ |
| CHARGING MODE | ○ | X | ○ | ● | X |

For example, when sufficient electric power is stored in the power storage device and a high torque and a high rotation speed are not requested during the start of the vehicle, selection is made for the first EV mode in which only the second rotary electric machine MG2 is driven as a power source. At this time, control is performed so that the internal combustion engine EG and the first rotary electric machine MG1 are stopped and the first engagement device CL1 and the second engagement device CL2 are disengaged. The driving power of the second rotary electric machine MG2 is transmitted to the output differential gear mechanism DF via the third transmission system 3, and the wheels W are driven. The first engagement device CL1 may be engaged.

When sufficient electric power is stored in the power storage device and a higher torque than that in the first EV mode is requested, selection can be made for the second EV mode in which the first rotary electric machine MG1 and the second rotary electric machine MG2 are driven as power sources. At this time, the internal combustion engine EG is stopped and the first rotary electric machine MG1 is driven together with the second rotary electric machine MG2. The first engagement device CL1 is controlled to be disengaged and the second engagement device CL2 is engaged. Therefore, the driving power of the first rotary electric machine MG1 is transmitted to the output differential gear mechanism DF via the second transmission system 2, and the driving power of the second rotary electric machine MG2 is transmitted to the output differential gear mechanism DF via the third transmission system 3. Thus, the wheels W are driven.

For example, when a sufficient amount of electric power is not stored in the power storage device, selection is made for a so-called series-hybrid mode (first HV mode) in which the first rotary electric machine MG1 generates electric power with the driving power of the internal combustion engine EG and the second rotary electric machine MG2 is driven by using the generated electric power. The internal combustion engine EG is driven and the first engagement device CL1 is engaged. Therefore, the driving power of the internal combustion engine EG is transmitted to the first rotary electric machine MG1 via the first transmission system 1, and the first rotary electric machine MG1 generates electric power. The second engagement device CL2 is controlled to be disengaged and the second transmission system 2 is interrupted. Therefore, the driving power of the internal combustion engine EG and the first rotary electric machine MG1 is not transmitted to the output differential gear mechanism DF. The driving power of the second rotary electric machine MG2 is transmitted to the output differential gear mechanism DF and the wheels W via the third transmission system 3.

When a higher torque or a higher rotation speed than that in the first hybrid mode is requested, selection can be made for a so-called parallel-hybrid mode (second HV mode) in which the wheels W are driven by transmitting the driving power of the internal combustion engine EG to the output differential gear mechanism DF in addition to the driving power of the second rotary electric machine MG2. The internal combustion engine EG is driven and the first engagement device CL1 is engaged. Therefore, the driving power of the internal combustion engine EG is transmitted to the first rotary electric machine MG1 via the first transmission system 1, and the first rotary electric machine MG1 generates electric power. Further, the second engagement device CL2 is engaged. Therefore, the driving power from the internal combustion engine EG can be transmitted to the output differential gear mechanism DF via the second transmission system 2. The driving power from the internal combustion engine EG is transmitted to the output differential gear mechanism DF via the second transmission system 2, and the driving power of the second rotary electric machine MG2 is transmitted to the output differential gear mechanism DF via the third transmission system 3. Thus, the wheels W are driven.

In the above state in the second hybrid mode, the second rotary electric machine MG2 is performing power running ("○" in the table) and the first rotary electric machine MG1 is generating electric power ("●" in the table). However, the first rotary electric machine MG1 need not perform power running or power generation (regeneration) ("x" in the table). In this mode, the first rotary electric machine MG1 may be controlled to output a driving force (perform power running) depending on the amount of electric power stored in the power storage device and the requested driving force ("○" in the table). At this time, the second rotary electric machine MG2 may perform power running ("○" in the table) or may be stopped ("x" in the table). When the second rotary electric machine MG2 is performing power running, the driving power of the internal combustion engine EG, the first rotary electric machine MG1, and the second rotary electric machine MG2 is transmitted to the output differential gear mechanism DF, and the wheels W are driven. When the second rotary electric machine MG2 is stopped, the driving power of the internal combustion engine EG and the first rotary electric machine MG1 is transmitted to the output differential gear mechanism DF, and the wheels W are driven.

When the first engagement device CL1 is engaged and the internal combustion engine EG is driven to cause the first rotary electric machine MG1 to generate electric power with the driving power of the internal combustion engine EG while the driving power is not transmitted to the output differential gear mechanism DF by stopping the second rotary electric machine MG2 and disengaging the second engagement device CL2, it is possible to achieve the charging mode in which the power storage device is charged while the vehicle is stopped.

As described above, the first drive device 4A includes the rotatably supported first shift drum 41, and the first cam mechanism 47 that converts a rotational motion of the first shift drum 41 into a linear motion and transmits the linear motion to the first engagement device CL1. Similarly, the second drive device 4B includes the rotatably supported second shift drum 42, and the second cam mechanism that converts a rotational motion of the second shift drum 42 into a linear motion and transmits the linear motion to the second engagement device CL2. The first shift drum 41 and the second shift drum 42 are coaxially disposed and connected via the drum drive shaft 49 so as to rotate integrally. The vehicle drive device 100 includes the drum drive source 6 that drives the drum drive shaft 49.

In the present embodiment, the first drive device 4A and the second drive device 4B are structured as the one common clutch drive device 4, and the first shift drum 41 and the second shift drum 42 partially share the members constituting them. The first shift drum 41 and the second shift drum 42 integrally rotate via the one common drum drive shaft 49.

The first shift drum 41, the second shift drum 42, and the drum drive shaft 49 are disposed on a drum rotation axis A0 different from and parallel to the first axis A1 to the fifth axis A5, and rotate about the drum rotation axis A0 serving as their rotation axes. The first shift drum 41 and the second shift drum 42 have cylindrical shapes centered on the drum rotation axis A0. The drum drive shaft 49 is a shaft member that connects the first shift drum 41 and the second shift drum 42 so that they rotate integrally, and is formed so as to extend along the drum rotation axis A0. Various motors can be adopted as the drum drive source 6. For example, an alternating-current rotary electric machine to be driven by alternating-current power of a plurality of phases can be adopted. More specifically, a servomotor or a stepping motor is preferably used as the drum drive source 6.

As shown in FIG. 1, the drum drive shaft 49 and the drum drive source 6 are connected via a speed reducer 5. The speed reducer 5 includes a first reduction gear 51 and a second reduction gear 52 having a larger diameter than the first reduction gear 51. The first reduction gear 51 is disposed on an axis different from and parallel to the drum rotation axis A0 and connected to a rotation shaft of the drum drive source 6. The second reduction gear 52 meshes with the first reduction gear 51, and is disposed on the drum rotation axis A0 and connected to the drum drive shaft 49.

As described above, the first shift drum 41 and the second shift drum 42 are connected so as to rotate integrally, and the drum drive source 6 drives the two drums. That is, the drum drive source 6 requires a large driving force to drive the two drums, but the size of the drum drive source 6 can easily be reduced by providing the speed reducer 5. Therefore, the size of the vehicle drive device 100 can easily be reduced as well.

Figure 2:
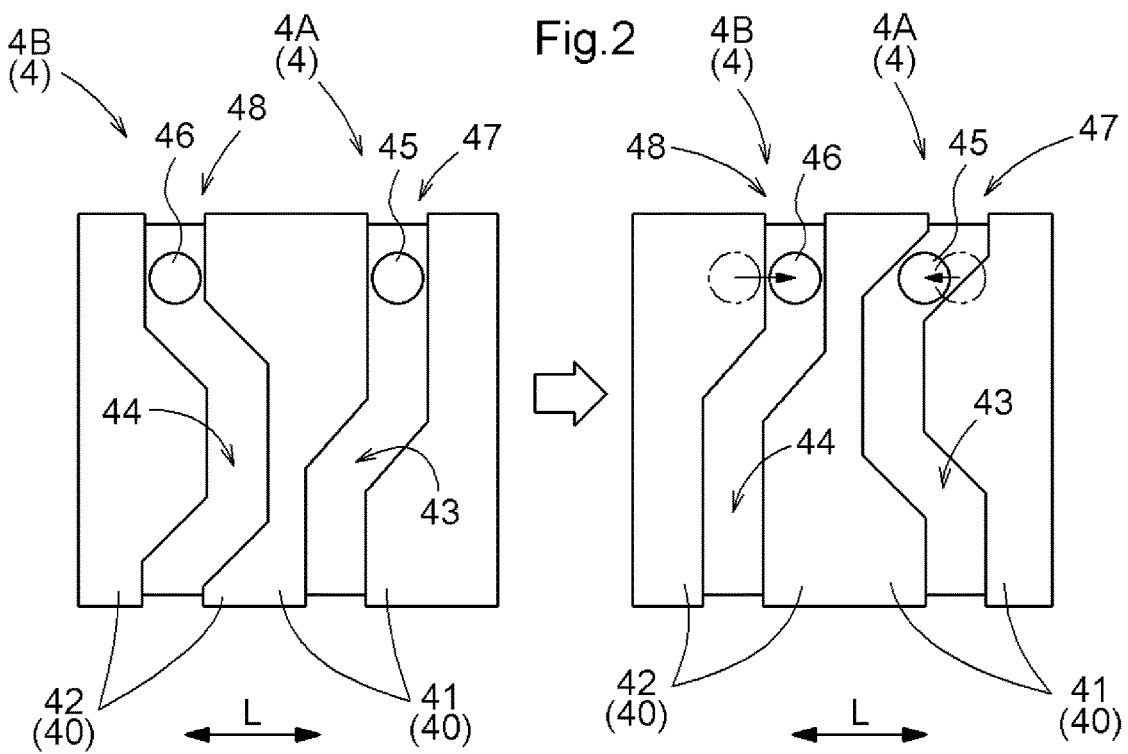
FIG. 2 is a diagram showing the principle of operation of drive devices that drive engagement devices.

As shown in FIGS. 1 and 2, the first cam mechanism 47 includes a first cam guide path 43 and a first cam follower 45. The second cam mechanism 48 includes a second cam guide path 44 and a second cam follower 46.

The first cam guide path 43 is provided along the rotation direction of the first shift drum 41. In the present embodiment, the first cam guide path 43 is a groove continuously formed on the outer peripheral surface of the first shift drum 41 along the circumferential direction. The first cam guide path 43 is formed such that the phase changes in response to the rotation of the first shift drum 41. The "phase" of the first cam guide path 43 is a position of the first cam guide path 43 in a direction along the rotation axis of the first shift drum 41 (in this case, the axial direction L). The first cam follower 45 performs linear motion in response to the phase change of the first cam guide path 43. The first cam follower 45 is formed so as to extend along a specific radial direction, and is disposed so that a part of the first cam follower 45 is positioned in the groove of the first cam guide path 43. The shape of the first cam guide path 43 is not limited to the groove shape. For example, the first cam guide path 43 may be a projection continuously formed on the outer peripheral surface of the first shift drum 41 along the circumferential direction. The first cam guide path 43 may be formed on the end face of the first shift drum 41 in the axial direction L or on the inner peripheral surface of the first shift drum 41.

The first engagement device CL1 can be driven by the linear motion of the first cam follower 45 along the axial direction L based on the phase of the first cam guide path 43. The first cam follower 45 is connected to a shift fork (not shown), and is connected to the first meshing member DS1 (dog sleeve) via the shift fork. Through the linear motion of the first cam follower 45 along the axial direction L, the engagement state of the first engagement device CL1 is switched.

Similarly, the second cam guide path 44 is provided along the rotation direction of the second shift drum 42. In the present embodiment, the second cam guide path 44 is a groove continuously formed on the outer peripheral surface of the second shift drum 42 along the circumferential direction. The second cam guide path 44 is formed such that the phase changes in response to the rotation of the second shift drum 42. The "phase" of the second cam guide path 44 is a position of the second cam guide path 44 in a direction along the rotation axis of the second shift drum 42 (in this case, the axial direction L). The second cam follower 46 performs linear motion in response to the phase change of the second cam guide path 44. The second cam follower 46 is formed so as to extend along a specific radial direction, and is disposed so that a part of the second cam follower 46 is positioned in the groove of the second cam guide path 44. The shape of the second cam guide path 44 is not limited to the groove shape. For example, the second cam guide path 44 may be a projection continuously formed on the outer peripheral surface of the second shift drum 42 along the circumferential direction. The second cam guide path 44 may be formed on the end face of the second shift drum 42 in the axial direction L or on the inner peripheral surface of the second shift drum 42.

The second engagement device CL2 can be driven by the linear motion of the second cam follower 46 along the axial direction L based on the phase of the second cam guide path 44. The second cam follower 46 is connected to a shift fork (not shown), and is connected to the second meshing member DS2 (dog sleeve) via the shift fork. Through the linear motion of the second cam follower 46 along the axial direction L, the engagement state of the second engagement device CL2 is switched.

That is, the first engagement device CL1 is the intermesh engagement device to be switched between the engaged state and the disengaged state depending on the position of the first meshing member DS1 in the axial direction L, and the second engagement device CL2 is the intermesh engagement device to be switched between the engaged state and the disengaged state depending on the position of the second meshing member DS2 in the axial direction L. The drum drive shaft 49 is disposed along the axial direction L, the first drive device 4A constituting the clutch drive device 4 drives the first meshing member DS1 in the axial direction L, and the second drive device 4B constituting the clutch drive device 4 drives the second meshing member DS2 in the axial direction L.

The first engagement device CL1 and the second engagement device CL2 that are the intermesh engagement devices are appropriately driven by the clutch drive device 4 (first drive device 4A and second drive device 4B) including a shift drum 40 (first shift drum 41 and second shift drum 42). Since the clutch drive device 4 (first drive device 4A and second drive device 4B) is disposed in the axial direction L along the rotation shaft of the first rotor 10, the radial dimension of the vehicle drive device 100 can easily be reduced.

Figure 3:
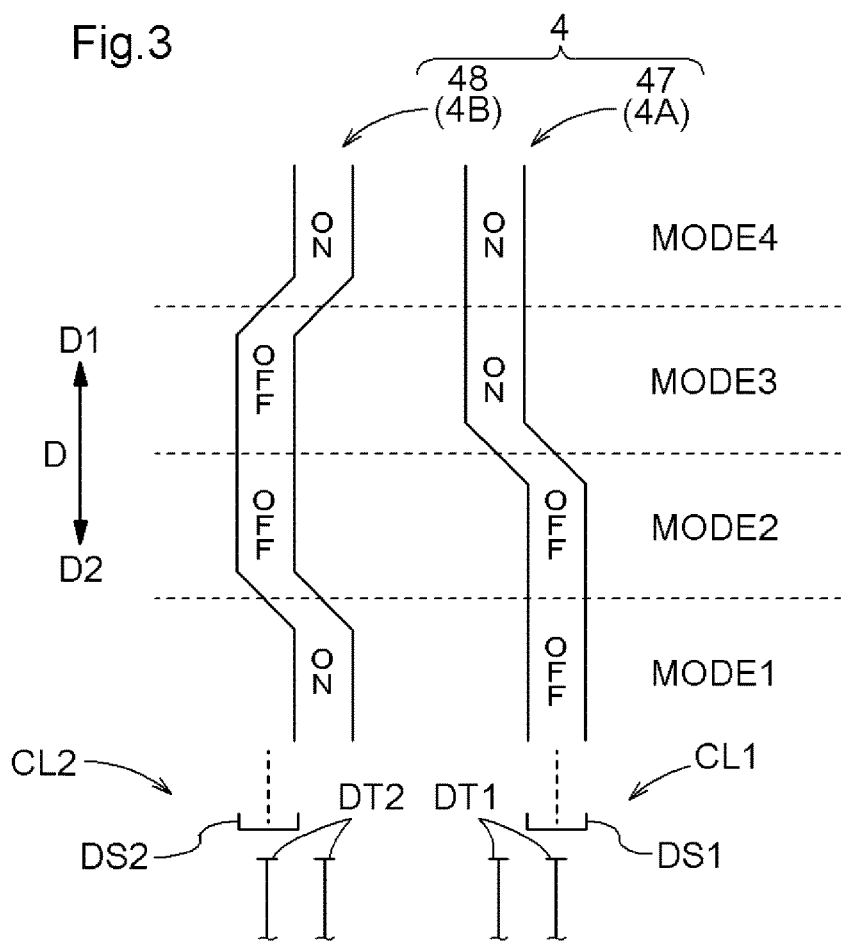
FIG. 3 is a state transition diagram showing a relationship between engagement states of a first engagement device and a second engagement device and operation modes of the vehicle drive device.

As described above, the first cam mechanism 47 and the second cam mechanism 48 switch the engagement states of the first engagement device CL1 and the second engagement device CL2 in response to the rotation of the drum drive shaft 49. Specifically, as shown in FIG. 3, the first cam mechanism 47 and the second cam mechanism 48 make state transition among four operation modes that are a first mode (MODE 1), a second mode (MODE 2), a third mode (MODE 3), and a fourth mode (MODE 4) in response to rotation to a first rotational side D1 that is one side in a rotation direction D about the drum drive shaft 49. The state transition diagram of FIG. 3 shows a relationship between the engagement states of the first engagement device CL1 and the second engagement device CL2 and the operation modes of the vehicle drive device 100 by using a developed diagram of the first cam guide path 43 and the second cam guide path 44 formed along the circumferential direction (rotation direction) of the first shift drum 41 and the second shift drum 42 having the cylindrical shapes.

The first mode is an operation mode in which the first engagement device CL1 is disengaged and the second engagement device CL2 is engaged. In this operation mode, as described above with reference to Table 1, it is possible to achieve a so-called two-motor EV mode (second EV mode) in which the transmission of the driving force between the internal combustion engine EG and the output members OUT is interrupted and the driving forces of both the first rotary electric machine MG1 and the second rotary electric machine MG2 are transmitted to the output members.

The second mode is an operation mode in which the first engagement device CL1 is disengaged and the second engagement device CL2 is disengaged. In this operation mode, as described above with reference to Table 1, it is possible to achieve a so-called one-motor EV mode (first EV mode) in which the transmission of the driving force between each of the internal combustion engine EG and the first rotary electric machine MG1 and the output members OUT is interrupted and the driving force of the second rotary electric machine MG2 is transmitted to the output members OUT.

The third mode is an operation mode in which the first engagement device CL1 is engaged and the second engagement device CL2 is disengaged. In this operation mode, as described above with reference to Table 1, it is possible to achieve the so-called series-hybrid mode (first HV mode) in which the driving force of the internal combustion engine EG is transmitted to the first rotary electric machine MG1 to cause the first rotary electric machine MG1 to generate electric power while the transmission of the driving force between each of the internal combustion engine EG and the first rotary electric machine MG1 and the output members OUT is interrupted, and the driving force of the second rotary electric machine MG2 is transmitted to the output members OUT.

The fourth mode is an operation mode in which the first engagement device CL1 is engaged and the second engagement device CL2 is engaged. In this operation mode, as described above with reference to Table 1, it is possible to achieve the so-called parallel-hybrid mode (second HV mode) in which the driving forces of the internal combustion engine, the first rotary electric machine, and the second rotary electric machine are transmitted to the output members.

The first cam mechanism 47 and the second cam mechanism 48 make state transition in order of the first mode, the second mode, the third mode, and the fourth mode in response to the rotation to the first rotational side D1. The first cam mechanism 47 and the second cam mechanism 48 make state transition in order of the fourth mode, the third mode, the second mode, and the first mode in response to rotation to a second rotational side D2.

In order to make switching from the two-motor EV mode to the parallel-hybrid mode, it is necessary to perform a process of first interrupting the transmission of the driving force between the first rotary electric machine MG1 and the second rotary electric machine MG2, transmitting the driving force between the internal combustion engine EG and the first rotary electric machine MG1, starting the internal combustion engine EG after synchronizing the rotation speeds of the internal combustion engine EG and the first rotary electric machine MG1 with the rotation speeds of the output members OUT, and transmitting the driving forces of the internal combustion engine EG and the first rotary electric machine MG1 to the output members OUT. The state transition of the operation modes can efficiently be made by setting the order of the state transition of the operation modes by the shift drum 40 to the order of the two-motor EV mode (first mode), the one-motor EV mode (second mode), the series-hybrid mode (third mode), and the parallel-hybrid mode (fourth mode). For example, when a change from a low-power state to a high-power state is needed as in a case where the stopped vehicle starts suddenly as described later, both the transition to the parallel-hybrid mode (fourth mode) and the transition to the two-motor EV mode (first mode) via the one-motor EV mode (second mode) can quickly be made because the series-hybrid mode (third mode) that is likely to be used in the low-power state is set between the one-motor EV mode (second mode) and the parallel-hybrid mode (fourth mode). Therefore, high power can quickly be transmitted to the wheels W.

For example, when starting the vehicle, the second mode is selected and the vehicle travels in the one-motor EV mode (first EV mode). When a higher torque or a higher rotation speed than that in the first EV mode is requested, state transition is made to the first mode (two-motor EV mode (second EV mode)) by rotating the shift drum 40 to the second rotational side D2. When the electric power stored in the power storage device is insufficient, state transition is made again to the second mode (one-motor EV mode (first EV mode)) by rotating the shift drum 40 to the first rotational side D1. By further rotating the shift drum 40 to the first rotational side D1, the first engagement device CL1 is engaged while maintaining the disengaged state of the second engagement device CL2. Then, the first rotary electric machine MG1 is driven and the internal combustion engine EG is started via the input member IN. Thus, state transition is made to the third mode (series-hybrid mode (first HV mode)). When an even higher torque or an even higher rotation speed is requested, state transition is made to the fourth mode (parallel-hybrid mode (second HV mode)) by rotating the shift drum 40 to the first rotational side D1.

Figure 4:
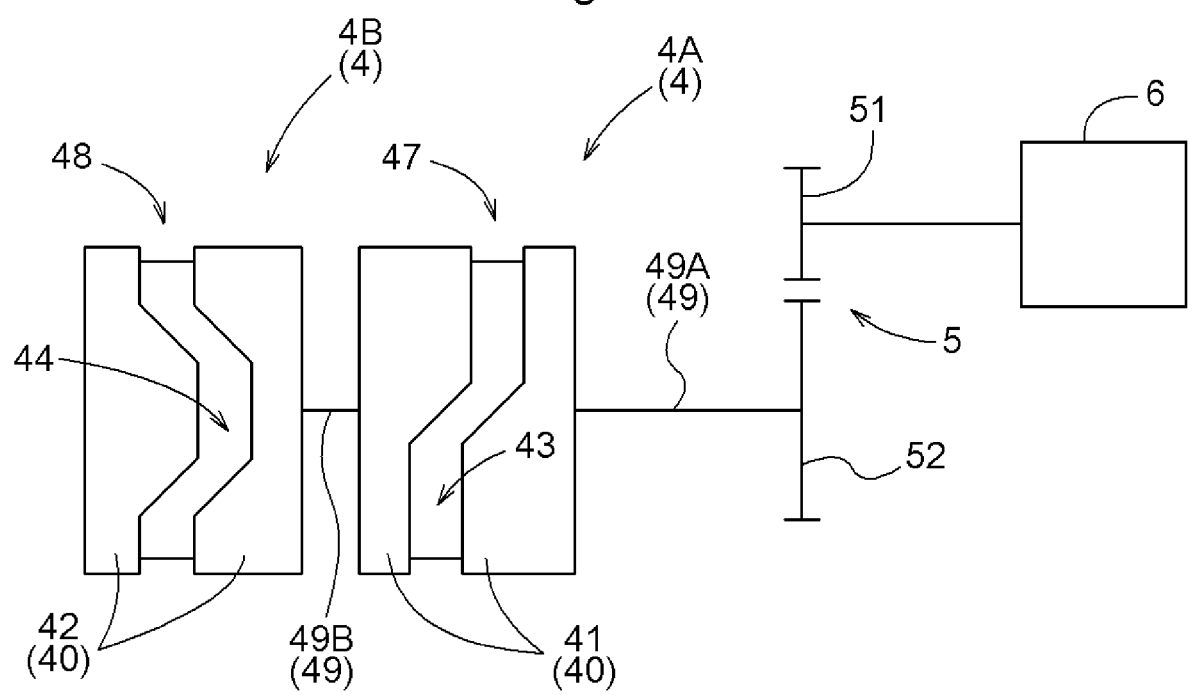
FIG. 4 is a diagram showing an example of another form of the drive devices that drive the engagement devices.

The above description exemplifies the form in which the first drive device 4A and the second drive device 4B are structured as the one common clutch drive device 4. Further, the above description exemplifies the form in which the first shift drum 41 and the second shift drum 42 partially share the members constituting them. As shown in FIG. 4, the first drive device 4A and the second drive device 4B may be structured by independent members. Also in this case, the first shift drum 41 and the second shift drum 42 integrally rotate via the drum drive shaft 49. For example, the drum drive shaft 49 may include a first drum drive shaft 49A and a second drum drive shaft 49B that rotate integrally, the first drum drive shaft 49A may connect the speed reducer 5 and the first shift drum 41, and the second drum drive shaft 49B may connect the first shift drum 41 and the second shift drum 42.

As described above, according to the vehicle drive device 100 of the present embodiment, it is possible to realize a hybrid vehicle drive device capable of executing both the series-hybrid mode and the parallel-hybrid mode. Both the first drive device 4A that drives the first engagement device CL1 and the second drive device 4B that drives the second engagement device CL2 can be driven by the one drum drive source 6. Therefore, the cost of the vehicle drive device 100 can be reduced and the size of the vehicle drive device 100 can easily be reduced compared to a configuration in which independent drive sources are provided for these two drive devices.

The clutch drive device 4 described above is applicable not only to the vehicle drive device 100 described above with reference to FIG. 1 (first vehicle drive device 100A) but also to the vehicle drive devices 100 having other configurations (second vehicle drive device 100B, third vehicle drive device 100C, and fourth vehicle drive device 100D). Such other configuration examples will be described below. Description of the same matters as those of the first vehicle drive device 100A described with reference to FIG. 1 will be omitted as appropriate. Description of matters common to the second vehicle drive device 100B, the third vehicle drive device 100C, and the fourth vehicle drive device 100D will also be omitted as appropriate.

FIG. 5 shows the skeleton of the second vehicle drive device 100B. FIG. 6 shows the skeleton of the third vehicle drive device 100C. The second vehicle drive device 100B and the third vehicle drive device 100C each include the counter gear mechanism CG, the output differential gear mechanism DF, and a plurality of planetary gear mechanisms as the plurality of gear mechanisms. The second vehicle drive device 100B and the third vehicle drive device 100C each include a planetary gear type speed increaser PG1 and a planetary gear type speed reducer PG2 as the plurality of planetary gear mechanisms. When distinguishing the second vehicle drive device 100B and the third vehicle drive device 100C, the second vehicle drive device 100B includes a first planetary gear type speed increaser PG11 and a first planetary gear type speed reducer PG12, and the third vehicle drive device 100C includes a second planetary gear type speed increaser PG21 and a second planetary gear type speed reducer PG22.

First, the configuration of the second vehicle drive device 100B will be described. The planetary gear type speed increaser PG1 described above is a planetary gear mechanism provided in the first transmission system 1. The planetary gear type speed increaser PG1 increases the speed of rotation of the input member IN and transmits the rotation to the first rotor 10. The planetary gear type speed reducer PG2 is a planetary gear mechanism provided in the second transmission system 2. The planetary gear type speed reducer PG2 reduces the speed of rotation of the first rotor 10 and transmits the rotation to the first counter gear 61. Although details will be described later, the planetary gear type speed increaser PG1 includes a first rotation element E1, a second rotation element E2, and a third rotation element E3. The first rotation element E1 is drivingly connected to the first rotor 10. The second rotation element E2 is drivingly connected to the input member IN. The third rotation element E3 is selectively connected to a non-rotating member (herein, the case CS) by the first engagement device CL1.

The input member IN, the first rotary electric machine MG1, the planetary gear type speed increaser PG1, the planetary gear type speed reducer PG2, the first engagement device CL1, and the second engagement device CL2 are disposed on the first axis A1. The counter gear mechanism CG is disposed on the fifth axis A5 different from and parallel to the first axis A1. The output differential gear mechanism DF is disposed on the second axis A2 different from and parallel to the first axis A1 and the fifth axis A5. The second rotary electric machine MG2 is disposed on the fourth axis A4 different from and parallel to the first axis A1, the second axis A2, and the fifth axis A5. Power transmission between the internal combustion engine EG and the input member IN and power transmission between the output members OUT and the wheels W are the same as those in the first vehicle drive device 100A.

The first transmission system 1 that drivingly connects the input member IN and the first rotor 10 includes the planetary gear type speed increaser PG1 and the first engagement device CL1. The first rotor shaft 11 can also be included in the first transmission system 1. The planetary gear type speed increaser PG1 includes a first sun gear S1 ("S11" when distinguished from that in the third vehicle drive device 100C; the same applies hereinafter), a first carrier C1 (C11), a first ring gear R1 (R11), and pinion gears supported by the first carrier C1. The pinion gears include sun gear-side pinion gears that mesh with the first sun gear S1, and ring gear-side pinion gears that mesh with the first ring gear R1. The planetary gear type speed increaser PG1 is a double-pinion type planetary gear mechanism in which the two types of pinion gear mesh with each other.

In this example, the first sun gear S1 corresponds to the first rotation element E1, the first carrier C1 corresponds to the second rotation element E2, and the first ring gear R1 corresponds to the third rotation element E3. As shown in FIG. 5, the input member IN is drivingly connected to the first carrier C1 (second rotation element E2), and the first rotor shaft 11 that rotates integrally with the first rotor 10 is drivingly connected to the first sun gear S1 (first rotation element E1). The first ring gear R1 (third rotation element E3) is selectively connected to the case CS that is the non-rotating member by the first engagement device CL1. When the first ring gear R1 is connected to the case CS by the first engagement device CL1, the driving power input from the internal combustion engine EG via the input member IN is transmitted to the first rotary electric machine MG1 with its speed increased by the planetary gear type speed increaser PG1.

The order of rotation speeds of the first rotation element E1, the second rotation element E2, and the third rotation element E3 is the stated order. By drivingly connecting the input member IN to the second rotation element E2, drivingly connecting the first rotor 10 to one of the first rotation element E1 and the third rotation element E3, and fixing the other to the case CS, the rotation of the input member IN is transmitted to the first rotor 10 with its speed increased. In a state in which the first engagement device CL1 is engaged, the rotation speed is higher in the order of the first rotation element E1, the second rotation element E2, and the third rotation element E3. The rotation of the input member IN (internal combustion engine EG) connected to the second rotation element E2 is transmitted to the first rotor 10 connected to the first rotation element E1 with its speed increased.

In the present application, the "order of rotation speeds" means the order of rotation speeds of the rotation elements in a rotating state. The rotation speeds of the rotation elements change depending on the rotating state of the planetary gear mechanism, but the order of the rotation speeds of the rotation elements is constant because it is determined by the structure of the planetary gear mechanism. The "order of rotation speeds of rotation elements" is the same as the placement order of the rotation elements in a velocity diagram (nomogram). The "placement order of rotation elements in velocity diagram" is the order in which the axes corresponding to the rotation elements in the velocity diagram (nomogram) are placed along a direction orthogonal to the axes. Although the placement direction of the axes corresponding to the rotation elements in the velocity diagram (nomogram) varies depending on how the velocity diagram is drawn, the placement order is constant because it is determined by the structure of the planetary gear mechanism.

The above description exemplifies the form in which the planetary gear type speed increaser PG1 is structured by the double-pinion type planetary gear mechanism. The planetary gear type speed increaser PG1 may be structured by a single-pinion type planetary gear mechanism. The above order of the rotation speeds of the first rotation element E1, the second rotation element E2, and the third rotation element E3 is merely an example. The order of the rotation speeds may be changed as long as the rotation of the second rotation element E2 (input member IN) is transmitted to the first rotation element E1 (first rotor 10) with its speed increased.

When the first engagement device CL1 is disengaged and the first ring gear R1 is not connected to the case CS, the first carrier C1 idles and the power transmission between the input member IN and the first rotor 10 in the first transmission system 1 is interrupted. Therefore, the driving power from the internal combustion engine EG is not transmitted to the first rotor 10.

In the second vehicle drive device 100B, the planetary gear type speed increaser PG1, the first rotary electric machine MG1, and the planetary gear type speed reducer PG2 are disposed in the stated order from the first axial side L1 to the second axial side L2. The first rotor shaft 11 is connected to the first sun gear S1 of the planetary gear type speed increaser PG1 on the first axial side L1 of the first rotary electric machine MG1 so as to rotate integrally with the first sun gear S1, and is connected to a second sun gear S2 (described later) of the planetary gear type speed reducer PG2 on the second axial side L2 of the first rotary electric machine MG1 so as to rotate integrally with the second sun gear S2.

The planetary gear type speed reducer PG2 includes the second sun gear S2 ("S12" when distinguished from that in the third vehicle drive device 100C; the same applies hereinafter), a second carrier C2 (C12), a second ring gear R2 (R12), and pinion gears supported by the second carrier C2. The pinion gears mesh with the second sun gear S2 and the second ring gear R2. The planetary gear type speed reducer PG2 is a single-pinion type planetary gear mechanism. In this example, the second sun gear S2 corresponds to a fourth rotation element E4, the second carrier C2 corresponds to a fifth rotation element E5, and the second ring gear R2 corresponds to a sixth rotation element E6.

The second sun gear S2 (fourth rotation element E4) is connected to the first rotor shaft 11 so as to rotate integrally with the first rotor 10. The second carrier C2 (fifth rotation element E5) is selectively connected to the case CS that is the non-rotating member via the second engagement device CL2. The second ring gear R2 (sixth rotation element E6) is connected to the counter drive gear 35 so as to rotate integrally with the counter drive gear 35. As described later, the counter drive gear 35 is a gear that meshes with the first counter gear 61 of the counter gear mechanism CG. In the present embodiment, the counter drive gear 35 is disposed on the radially outer side of the second ring gear R2 and connected to the second ring gear R2 so as to rotate integrally with the second ring gear R2.

As described above, the second carrier C2 is selectively connected to the case CS that is the non-rotating member by the second engagement device CL2. When the second carrier C2 is connected to the case CS by the second engagement device CL2, the driving power input to the planetary gear type speed reducer PG2 via the first rotor shaft 11 is transmitted with its speed reduced by the planetary gear type speed reducer PG2.

The order of rotation speeds of the fourth rotation element E4, the fifth rotation element E5, and the sixth rotation element E6 is the stated order. By fixing the fifth rotation element E5 to the case CS, drivingly connecting the member on the drive source side (in this case, the first rotary electric machine MG1) to the fourth rotation element E4 or the sixth rotation element E6 that has a larger absolute value of the rotation speed, and drivingly connecting the member on the output member OUT side to the fourth rotation element E4 or the sixth rotation element E6 that has a smaller absolute value of the rotation speed, the rotation of the drive source is transmitted to the output member OUT side with its speed reduced. In a state in which the second engagement device CL2 is engaged, the rotation of the fourth rotation element E4 is reversed and transmitted to the sixth rotation element E6 with its speed reduced. Therefore, the rotation of the first rotor 10 connected to the fourth rotation element E4 is transmitted to the counter drive gear 35 connected to the sixth rotation element E6 with its speed reduced.

The description has been given about the exemplary form in which the planetary gear type speed reducer PG2 is structured by the single-pinion type planetary gear mechanism. The planetary gear type speed reducer PG2 may be structured by a double-pinion type planetary gear mechanism. The above order of the rotation speeds of the fourth rotation element E4, the fifth rotation element E5, and the sixth rotation element E6 is merely an example. The order of the rotation speeds may be changed as long as the rotation of the fourth rotation element E4 (first rotor 10) is transmitted to the sixth rotation element E6 (counter drive gear 35) with its speed reduced.

When the second engagement device CL2 is disengaged and the second carrier C2 is not connected to the case CS, the second ring gear R2 idles and the power transmission between the first rotor shaft 11 and the first counter gear 61 is interrupted. That is, the power transmission between the input member IN and the first counter gear 61 in the second transmission system 2 is interrupted. Therefore, the driving power from the internal combustion engine EG is not transmitted to the first counter gear 61.

The second counter gear 62 meshes with the differential input gear 71 of the output differential gear mechanism DF. Therefore, the counter gear mechanism CG is disposed in the power transmission path between the counter drive gear 35 and the output differential gear mechanism DF to transmit the driving power therebetween. The first counter gear 61 meshes with the second rotary electric machine output gear 29. The second rotary electric machine output gear 29 is connected to the second rotor shaft 21 so as to rotate integrally with the second rotor shaft 21. The second rotor shaft 21 is connected to the rotor of the second rotary electric machine MG2 and rotates integrally with the second rotor 20. The driving power from the second rotary electric machine MG2 is transmitted to the output differential gear mechanism DF via the first counter gear 61. That is, the counter gear mechanism CG can combine the driving power from the internal combustion engine EG side and the first rotary electric machine MG1 side and the driving power from the second rotary electric machine MG2 side and transmit the combined driving power to the output differential gear mechanism DF.

In the second vehicle drive device 100B, the second engagement device CL2 is disposed on the second axial side L2 of the first engagement device CL1, and the cam portion (second cam follower 46) of the second cam mechanism 48 of the second drive device 4B is disposed on the second axial side L2 of the cam portion (first cam follower 45) of the first cam mechanism 47 of the first drive device 4A. Thus, the sizes of the transmission mechanisms from the cam portions of the cam mechanisms to the engagement devices can easily be reduced. In the second vehicle drive device 100B, the second axial side L2 corresponds to a "specific axial side".

The second vehicle drive device 100B can also be driven in the plurality of operation modes as described above with reference to Table 1 depending on the operation states of the internal combustion engine EG, the first rotary electric machine MG1, the second rotary electric machine MG2, the first engagement device CL1, and the second engagement device CL2.

Next, the third vehicle drive device 100C will be described with reference to FIG. 6. Description of the same matters as those of the first vehicle drive device 100A and the second vehicle drive device 100B will be omitted as appropriate. Similarly to the second vehicle drive device 100B, the first transmission system 1 that drivingly connects the input member IN and the first rotor 10 includes the planetary gear type speed increaser PG1 and the first engagement device CL1. The first rotor shaft 11 can also be included in the first transmission system 1. The planetary gear type speed increaser PG1 includes the first sun gear S1 ("S21" when distinguished from that in the second vehicle drive device 100B; the same applies hereinafter), the first carrier C1 (C21), the first ring gear R1 (R21), and the pinion gears supported by the first carrier C1. The planetary gear type speed increaser PG1 (second planetary gear type speed increaser PG21) of the third vehicle drive device 100C is a single-pinion type planetary gear mechanism. The pinion gears mesh with the first sun gear S1 and the first ring gear R1.

Similarly to the second vehicle drive device 100B, the first sun gear S1 corresponds to the first rotation element E1, the first carrier C1 corresponds to the second rotation element E2, and the first ring gear R1 corresponds to the third rotation element E3. As shown in FIG. 3, the input member IN is drivingly connected to the first carrier C1 (second rotation element E2), and the first rotor shaft 11 that rotates integrally with the first rotor 10 is drivingly connected to the first sun gear S1 (first rotation element E1). The first ring gear R1 (third rotation element E3) is selectively connected to the case CS that is the non-rotating member by the first engagement device CL1. When the first ring gear R1 is connected to the case CS by the first engagement device CL1, the driving power input from the internal combustion engine EG via the input member IN is transmitted to the first rotary electric machine MG1 with its speed increased by the planetary gear type speed increaser PG1 as shown in the velocity diagram of FIG. 6.

The description has been given about the exemplary form in which the planetary gear type speed increaser PG1 is structured by the single-pinion type planetary gear mechanism. Similarly to the second vehicle drive device 100B, the planetary gear type speed increaser PG1 may be structured by a double-pinion type planetary gear mechanism. Similarly to the second vehicle drive device 100B, the order of the rotation speeds of the first rotation element E1, the second rotation element E2, and the third rotation element E3 may be changed as long as the rotation of the second rotation element E2 (input member IN) is transmitted to the first rotation element E1 (first rotor 10) with its speed increased.

Similarly to the second vehicle drive device 100B, when the first engagement device CL1 is disengaged and the first ring gear R1 is not connected to the case CS, the first carrier C1 idles and the power transmission between the input member IN and the first rotor 10 is interrupted. Therefore, the driving power from the internal combustion engine EG is not transmitted to the first rotor 10.

In the third vehicle drive device 100C, the first rotary electric machine MG1, the second engagement device CL2, the second rotary electric machine MG2, the planetary gear type speed reducer PG2, the planetary gear type speed increaser PG1, and the first engagement device CL1 are disposed in the stated order from the first axial side L1 to the second axial side L2. The first rotary electric machine MG1 and the set of the planetary gear type speed increaser PG1 and the first engagement device CL1 are disposed at both ends of the first axis A1 in the axial direction L. The first rotor shaft 11 is connected to the first rotary electric machine MG1 at the end of the first axial side L1 on the first axis A1, and is drivingly connected to the planetary gear type speed increaser PG1 and the first engagement device CL1 at the end of the second axial side L2.

The first rotor shaft 11 is selectively connected to the second rotor 20 and the second sun gear S2 of the planetary gear type speed reducer PG2 by the second engagement device CL2 disposed between the first rotary electric machine MG1 and the second rotary electric machine MG2 in the axial direction L.

In the third vehicle drive device 100C, the second engagement device CL2 is disposed on the first axial side L1 of the first engagement device CL1, and the cam portion (second cam follower 46) of the second cam mechanism 48 of the second drive device 4B is disposed on the first axial side L1 of the cam portion (first cam follower 45) of the first cam mechanism 47 of the first drive device 4A. Thus, the sizes of the transmission mechanisms from the cam portions of the cam mechanisms to the engagement devices can easily be reduced. In the third vehicle drive device 100C, the first axial side L1 corresponds to the "specific axial side".

The second sun gear S2 (seventh rotation element E7) is selectively connected to the first rotor 10 via the second engagement device CL2 and connected to the second rotor 20 so as to rotate integrally with the second rotor 20. An eighth rotation element E8 is connected to the counter drive gear 35 meshing with the first counter gear 61 so as to rotate integrally with the counter drive gear 35. A ninth rotation element E9 is connected to the case CS that is the non-rotating member. The counter drive gear 35 is a gear that meshes with the first counter gear 61 of the counter gear mechanism CG. In the present embodiment, the counter drive gear 35 is disposed on the radially outer side of the second ring gear R2 and connected to the second carrier C2 so as to rotate integrally with the second carrier C2.

The second ring gear R2 is fixed to the case CS. The second sun gear S2 that rotates integrally with the second rotor 20 is selectively drivingly connected to the first rotor 10 by the second engagement device CL2. When the second sun gear S2 is drivingly connected to the first rotor 10, the driving power input to the planetary gear type speed reducer PG2 via the first rotor shaft 11 is output from the second carrier C2 with its speed reduced by the planetary gear type speed reducer PG2, and is transmitted to the counter gear mechanism CG via the counter drive gear 35.

The order of rotation speeds of the seventh rotation element E7, the eighth rotation element E8, and the ninth rotation element E9 is the stated order. By drivingly connecting the member on the output member OUT side to the eighth rotation element E8, drivingly connecting the member on the drive source side (in this case, the first rotary electric machine MG1) to one of the seventh rotation element E7 and the seventh rotation element E7, and fixing the other to the case CS, the rotation of the member on the drive source side is transmitted to the member on the output member OUT side (in this case, the counter drive gear 35) with its speed reduced. The rotation speed is lower in the order of the seventh rotation element E7, the eighth rotation element E8, and the ninth rotation element E9. The rotation of the member on the drive source side that is connected to the seventh rotation element E7 is transmitted to the member on the output member OUT side that is connected to the eighth rotation element E8 with its speed reduced.

The description has been given about the exemplary form in which the planetary gear type speed reducer PG2 is structured by the single-pinion type planetary gear mechanism. The planetary gear type speed reducer PG2 may be structured by a double-pinion type planetary gear mechanism. The order of the rotation speeds of the seventh rotation element E7, the eighth rotation element E8, and the ninth rotation element E9 may be changed as long as the rotation of the seventh rotation element E7 (first rotor 10) is transmitted to the ninth rotation element E9 (counter drive gear 35) with its speed reduced.

When the second engagement device CL2 is disengaged, the power transmission between the first rotor shaft 11 and the first counter gear 61 is interrupted. Therefore, the power transmission between the input member IN and the first counter gear 61 is also interrupted. Thus, the driving power from the internal combustion engine EG is not transmitted to the first counter gear 61.

The second counter gear 62 meshes with the differential input gear 71 of the output differential gear mechanism DF. Therefore, the counter gear mechanism CG is disposed in the power transmission path between the counter drive gear 35 and the output differential gear mechanism DF to transmit the driving power therebetween. The second rotor 20 of the second rotary electric machine MG2 is connected to the second sun gear S2 of the planetary gear type speed reducer PG2 so as to rotate integrally with the second sun gear S2. The second carrier C2 of the planetary gear type speed reducer PG2 is drivingly connected to the first counter gear 61 via the counter drive gear 35. That is, the driving power from the second rotary electric machine MG2 can be transmitted to the output differential gear mechanism DF via the first counter gear 61. Thus, the counter gear mechanism CG can combine the driving power from the internal combustion engine EG side and the first rotary electric machine MG1 side and the driving power from the second rotary electric machine MG2 side and transmit the combined driving power to the output differential gear mechanism DF.

The third vehicle drive device 100C can also be driven in the plurality of operation modes as described above with reference to Table 1 depending on the operation states of the internal combustion engine EG, the first rotary electric machine MG1, the second rotary electric machine MG2, the first engagement device CL1, and the second engagement device CL2.

Next, the fourth vehicle drive device 100D will be described with reference to FIG. 7. Description of the same matters as those of the first vehicle drive device 100A, the second vehicle drive device 100B, and the third vehicle drive device 100C will be omitted as appropriate. The fourth vehicle drive device 100D includes the input member IN drivingly connected to the internal combustion engine EG, the output members OUT drivingly connected to the wheels W, the first rotary electric machine MG1 including the first rotor 10, the second rotary electric machine MG2 including the second rotor 20, and the plurality of gear mechanisms. The plurality of gear mechanisms of the fourth vehicle drive device 100D includes the counter gear mechanism CG and the output differential gear mechanism DF.

The output differential gear mechanism DF includes the differential input gear 71 meshing with the second counter gear 62, and distributes the rotation of the differential input gear 71 to the pair of output members OUT. The output differential gear mechanism DF is disposed on the second axis A2 different from and parallel to the first axis A1. The counter gear mechanism CG includes the first counter gear 61 and the second counter gear 62 that rotates integrally with the first counter gear 61. The counter gear mechanism CG is disposed on the fifth axis A5 different from and parallel to the first axis A1 and the second axis A2. The second rotor gear 25 that rotates integrally with the second rotor 20 is disposed on the third axis A3 where the second rotary electric machine MG2 is disposed. An idler gear 33 that meshes with both the second rotor gear 25 and the first counter gear 61 is disposed on the first axis A1.

The input gear 31 is disposed on the first axis A1 to drivingly connect the input member IN disposed on the first axis A1 and the first rotor 10 disposed on the third axis A3. The first rotor gear 15 that rotates integrally with the first rotor 10 is disposed on the third axis A3. Specifically, the first rotor gear 15 is connected to the first rotor shaft 11 that rotates integrally with the first rotor 10. Thus, in the fourth vehicle drive device 100D, the first rotary electric machine MG1 and the second rotary electric machine MG2 are disposed coaxially. The input gear 31 disposed on the first axis A1 is selectively connected to the input member IN via the first engagement device CL1. The input gear 31 and the first rotor gear 15 mesh with each other. When the input member IN and the input gear 31 are connected via the first engagement device CL1, the driving power from the input member IN is transmitted to the first rotor 10.

When the first engagement device CL1 is disengaged, the input gear 31 is not connected to the input member IN and the driving power from the internal combustion engine EG is not transmitted to the input gear 31. Therefore, no driving force is transmitted between the internal combustion engine EG and the first rotor 10.

The counter gear mechanism CG includes the first counter gear 61 and the second counter gear 62 that rotates integrally with the first counter gear 61. The first counter gear 61 is disposed on the first axial side L1 of the second counter gear 62. The second counter gear 62 is a gear having a smaller diameter than the first counter gear 61. The speed of rotation transmitted from the second rotary electric machine MG2 side is reduced and the rotation is transmitted to the output differential gear mechanism DF by the counter gear mechanism CG.

The first counter gear 61 is drivingly connected, via the idler gear 33, to the second rotor gear 25 connected to the second rotor shaft 21. The second counter gear 62 that rotates integrally with the first counter gear 61 meshes with the differential input gear 71. Therefore, the driving power is transmitted between the second rotor 20 and the output members OUT via the second rotor gear 25, the idler gear 33, the counter gear mechanism CG, and the output differential gear mechanism DF.

The second engagement device CL2 in the engaged state connects the first rotor shaft 11 and the second rotor shaft 21. By connecting the first rotor shaft 11 and the second rotor shaft 21, the driving power from the internal combustion engine EG side and the first rotary electric machine MG1 side and the driving power from the second rotary electric machine MG2 side can be combined and transmitted to the output differential gear mechanism DF. The driving power from the first rotor 10 is transmitted to the output members OUT via the second rotor shaft 21, the second rotor gear 25, the idler gear 33, the counter gear mechanism CG, and the output differential gear mechanism DF.

The fourth vehicle drive device 100D can also be driven in the plurality of operation modes as described above with reference to Table 1 depending on the operation states of the internal combustion engine EG, the first rotary electric machine MG1, the second rotary electric machine MG2, the first engagement device CL1, and the second engagement device CL2.

[Overview of Embodiments]

Hereinafter, an overview of the vehicle drive device (100) described above will be described briefly.

As one aspect, a vehicle drive device (100) includes an input member (IN) drivingly connected to an internal combustion engine (EG), an output member (OUT) drivingly connected to a wheel (W), a first rotary electric machine (MG1) including a first rotor (10), a second rotary electric machine (MG2) including a second rotor (20), a first engagement device (CL1) configured to connect or disconnect power transmission between the input member (IN) and the first rotor (10), a second engagement device (CL2) configured to connect or disconnect power transmission between the first rotor (10) and the output member (OUT), a first drive device (4A) configured to drive the first engagement device (CL1), and a second drive device (4B) configured to drive the second engagement device (CL2), in which the first drive device (4A) includes a rotatably supported first shift drum (41), and a first cam mechanism (47) configured to convert a rotational motion of the first shift drum (41) into a linear motion and transmit the linear motion to the first engagement device (CL1), the second drive device (4B) includes a rotatably supported second shift drum (42), and a second cam mechanism (48) configured to convert a rotational motion of the second shift drum (42) into a linear motion and transmit the linear motion to the second engagement device (CL2), the first shift drum (41) and the second shift drum (42) are coaxially disposed and connected via a drum drive shaft (49) so as to rotate integrally, and a drum drive source (6) is provided to drive the drum drive shaft (49).

According to this configuration, it is possible to realize a hybrid vehicle drive device capable of executing both the series-hybrid mode and the parallel-hybrid mode. Both the first drive device (4A) that drives the first engagement device (CL1) and the second drive device (4B) that drives the second engagement device (CL2) can be driven by the one drum drive source (6). Therefore, the cost of the vehicle drive device (100) can be reduced and the size of the vehicle drive device (100) can easily be reduced compared to a configuration in which independent drive sources are provided for these two drive devices (4). That is, according to this configuration, it is possible to facilitate the reduction in the size and cost of the vehicle drive device (100) for a hybrid vehicle.

In the vehicle drive device (100), it is preferable that the first cam mechanism (47) and the second cam mechanism (48) be configured to, in response to rotation to a first rotational side (D1) that is one side in a rotation direction about the drum drive shaft (49), make state transition in order of a first mode in which the first engagement device (CL1) is disengaged and the second engagement device (CL2) is engaged, a second mode in which the first engagement device (CL1) is disengaged and the second engagement device (CL2) is disengaged, a third mode in which the first engagement device (CL1) is engaged and the second engagement device (CL2) is disengaged, and a fourth mode in which the first engagement device (CL1) is engaged and the second engagement device (LC2) is engaged, the first rotary electric machine (MG1) and the second rotary electric machine (MG2) be driven in the first mode, only the second rotary electric machine (MG2) be driven in the second mode, the first rotary electric machine (MG1) generate electric power with driving power of the internal combustion engine (EG) and the second rotary electric machine (MG2) be driven in the third mode, and the internal combustion engine (EG) be driven in the fourth mode.

In the first mode, it is possible to achieve the so-called two-motor EV mode in which the transmission of the driving force between the internal combustion engine (EG) and the output member (OUT) is interrupted and the driving forces of both the first rotary electric machine (MG1) and the second rotary electric machine (MG2) are transmitted to the output member. In the second mode, it is possible to achieve the so-called one-motor EV mode in which the transmission of the driving force between each of the internal combustion engine (EG) and the first rotary electric machine (MG1) and the output member (OUT) is interrupted and the driving force of the second rotary electric machine (MG2) is transmitted to the output member (OUT). In the third mode, it is possible to achieve the so-called series-hybrid mode in which the driving force of the internal combustion engine (EG) is transmitted to the first rotary electric machine (MG1) to cause the first rotary electric machine (MG1) to generate electric power while the transmission of the driving force between each of the internal combustion engine (EG) and the first rotary electric machine (MG1) and the output member (OUT) is interrupted, and the driving force of the second rotary electric machine (MG2) is transmitted to the output member (OUT). In the fourth mode, it is possible to achieve the so-called parallel-hybrid mode in which the driving forces of the internal combustion engine (EG), the first rotary electric machine (MG1), and the second rotary electric machine (MG2) are transmitted to the output member. According to this configuration, the first cam mechanism (47) and the second cam mechanism (48) make state transition in the order of the first mode, the second mode, the third mode, and the fourth mode in response to the rotation to the first rotational side (D1). The first cam mechanism (47) and the second cam mechanism (48) make state transition in order of the fourth mode, the third mode, the second mode, and the first mode in response to rotation to the second rotational side (D2).

According to this configuration, the third mode (so-called series-hybrid mode) that is likely to be used in a low-power state is set between the second mode (so-called one-motor EV mode) and the fourth mode (so-called parallel-hybrid mode). Therefore, when transition is made from the third mode to the first mode (so-called two-motor EV mode) via the second mode or from the third mode to the fourth mode in response to a request for higher power, the transition process can be performed quickly. Thus, high power can quickly be transmitted to the wheel (W).

In the vehicle drive device (100), assuming that a direction along a rotation shaft (11) of the first rotor (10) is an axial direction (L), it is preferable that the first engagement device (CL1) be an intermesh engagement device to be switched between an engaged state and a disengaged state depending on a position of a first meshing member (DS1) in the axial direction (L), the second engagement device (CL2) be an intermesh engagement device to be switched between an engaged state and a disengaged state depending on a position of a second meshing member (DS2) in the axial direction (L), the drum drive shaft (6) be disposed along the axial direction (L), the first drive device (4A) be configured to drive the first meshing member (DS1) in the axial direction (L), and the second drive device (4B) be configured to drive the second meshing member (DS2) in the axial direction (L).

The first engagement device (CL1) and the second engagement device (CL2) that are the intermesh engagement devices are appropriately driven by the first drive device (4A) and the second drive device (4B) including the first shift drum (41) and the second shift drum (42), respectively.

Since the first drive device (4A) and the second drive device (4B) are disposed in the axial direction (L) along the rotation shaft of the first rotor (10), the radial dimension of the vehicle drive device (100) can easily be reduced.

In the vehicle drive device (100), it is preferable that the drum drive shaft (49) and the drum drive source (6) be connected via a speed reducer (5).

The first shift drum (41) and the second shift drum (42) are connected so as to rotate integrally, and the drum drive source (6) drives the two drums. That is, the drum drive source (6) requires a large driving force to drive the two drums. When the speed reducer (5) is provided as in this configuration, the size of the drum drive source (6) can easily be reduced. Therefore, the size of the vehicle drive device (100) can easily be reduced as well.

In the vehicle drive device (100), it is preferable that the second engagement device (CL2) be disposed on a specific axial side that is one side in the axial direction (L) with respect to the first engagement device (CL1), and a cam portion (46) of the second cam mechanism (48) of the second drive device (4B) be disposed on the specific axial side with respect to a cam portion (45) of the first cam mechanism (47) of the first drive device (4A).

Thus, the sizes of the transmission mechanisms from the cam portions of the cam mechanisms to the engagement devices can easily be reduced.

DESCRIPTION OF THE REFERENCE NUMERALS

1: first transmission system, 2: second transmission system, 3: third transmission system, 4A: first drive device, 4B: second drive device, 5: speed reducer, 6: drum drive source, 10: first rotor, 20: second rotor, 40: shift drum, 41: first shift drum, 42: second shift drum, 45: first cam follower (cam portion), 46: second cam follower (cam portion), 47: first cam mechanism, 48: second cam mechanism, 49: drum drive shaft, 100: vehicle drive device, CL1: first engagement device, CL2: second engagement device, D: rotation direction, D1: first rotational side, DS1: first meshing member, DS2: second meshing member, EG: internal combustion engine, EV: second, IN: input member, L: axial direction, L1: first axial side, MG1: first rotary electric machine, MG2: second rotary electric machine, OUT: output member, W: wheel

The invention claimed is:
1. A vehicle drive device comprising:
an input member drivingly connected to an internal combustion engine;
an output member drivingly connected to a wheel;
a first rotary electric machine including a first rotor;
a second rotary electric machine including a second rotor;
a first clutch configured to connect or disconnect power transmission between the input member and the first rotor;
a second clutch configured to connect or disconnect power transmission between the first rotor and the output member;
a first drive device configured to drive the first clutch; and
a second drive device configured to drive the second clutch, wherein
the first drive device includes a rotatably supported first shift drum, and a first cam mechanism configured to convert a rotational motion of the first shift drum into a linear motion and transmit the linear motion to the first clutch, the second drive device includes a rotatably supported second shift drum, and a second cam mechanism configured to convert a rotational motion of the second shift drum into a linear motion and transmit the linear motion to the second clutch, the first shift drum and the second shift drum are coaxially disposed and connected via a drum drive shaft so as to rotate integrally, and a drum drive source is provided to drive the drum drive shaft, wherein the first cam mechanism and the second cam mechanism are configured to, in response to rotation to a first rotational side that is one side in a rotation direction about the drum drive shaft, make state transition in order of:

a first mode in which the first clutch is disengaged and the second clutch is engaged;

a second mode in which the first clutch is disengaged and the second clutch is disengaged;

a third mode in which the first clutch is engaged and the second clutch is disengaged; and a fourth mode in which the first clutch is engaged and the second clutch is engaged, the first rotary electric machine and the second rotary electric machine are driven in the first mode, only the second rotary electric machine is driven in the second mode, the first rotary electric machine generates electric power with driving power of the internal combustion engine and the second rotary electric machine is driven in the third mode, and the internal combustion engine is driven in the fourth mode.

2. The vehicle drive device according to claim 1, wherein assuming that a direction along a rotation shaft of the first rotor is an axial direction, the first clutch is an intermesh engagement device to be switched between an engaged state and a disengaged state depending on a position of a first meshing member in the axial direction, the second clutch is an intermesh engagement device to be switched between an engaged state and a disengaged state depending on a position of a second meshing member in the axial direction, the drum drive shaft is disposed along the axial direction, the first drive device is configured to drive the first meshing member in the axial direction, and the second drive device is configured to drive the second meshing member in the axial direction.

3. The vehicle drive device according to claim 1, wherein the drum drive shaft and the drum drive source are connected via a speed reducer.

4. The vehicle drive device according to claim 2, wherein the drum drive shaft and the drum drive source are connected via a speed reducer.

5. The vehicle drive device according to claim 1, wherein assuming that a direction along a rotation shaft of the first rotor is an axial direction, the second clutch is disposed on a specific axial side that is one side in the axial direction with respect to the first clutch, and a cam portion of the second cam mechanism of the second drive device is disposed on the specific axial side with respect to a cam portion of the first cam mechanism of the first drive device.

6. The vehicle drive device according to claim 2, wherein assuming that a direction along a rotation shaft of the first rotor is an axial direction, the second clutch is disposed on a specific axial side that is one side in the axial direction with respect to the first clutch, and a cam portion of the second cam mechanism of the second drive device is disposed on the specific axial side with respect to a cam portion of the first cam mechanism of the first drive device.

7. The vehicle drive device according to claim 3, wherein assuming that a direction along a rotation shaft of the first rotor is an axial direction, the second clutch is disposed on a specific axial side that is one side in the axial direction with respect to the first clutch, and a cam portion of the second cam mechanism of the second drive device is disposed on the specific axial side with respect to a cam portion of the first cam mechanism of the first drive device.

8. The vehicle drive device according to claim 4, wherein assuming that a direction along a rotation shaft of the first rotor is an axial direction, the second clutch is disposed on a specific axial side that is one side in the axial direction with respect to the first clutch, and a cam portion of the second cam mechanism of the second drive device is disposed on the specific axial side with respect to a cam portion of the first cam mechanism of the first drive device.

* * * * *